United States Patent
Colby

(10) Patent No.: US 8,764,215 B2
(45) Date of Patent: Jul. 1, 2014

(54) SOLAR-POWERED HANGING BASKET LIGHT

(76) Inventor: Rory Colby, Perry, MI (US)

(*) Notice: Subject to any disclaimer, the term of this patent is extended or adjusted under 35 U.S.C. 154(b) by 79 days.

(21) Appl. No.: 13/552,382

(22) Filed: Jul. 18, 2012

(65) Prior Publication Data

US 2014/0022773 A1 Jan. 23, 2014

(51) Int. Cl.
*F21S 6/00* (2006.01)
*F21S 9/03* (2006.01)
*F21V 33/00* (2006.01)

(52) U.S. Cl.
CPC ............. *F21S 9/037* (2013.01); *F21V 33/0028* (2013.01); *Y10S 362/805* (2013.01)
USPC ................ 362/122; D26/55; 47/67; 362/183; 362/234; 362/805

(58) Field of Classification Search
CPC ............ A01G 9/02; F21S 9/032; F21S 9/035; F21S 9/037; F21W 2131/109; F21V 33/0028
USPC ........... 47/1.01 R, 67; D26/55; 362/122, 154, 362/155, 183, 234, 253, 805
See application file for complete search history.

(56) References Cited

U.S. PATENT DOCUMENTS

| | | | |
|---|---|---|---|
| 5,860,248 A * | 1/1999 | Peters | 47/67 |
| 7,497,583 B2 * | 3/2009 | Ma | 362/183 |
| D667,579 S * | 9/2012 | Cohen | D26/55 |
| 8,454,209 B2 * | 6/2013 | Colby | 362/183 |

* cited by examiner

*Primary Examiner* — Stephen F Husar

(57) ABSTRACT

A solar-powered light includes a body having an opening formed through the center from an upper side of the body to a bottom side of the body, at least one solar panel on the upper side of the body, and at least one light source on the bottom side of the body.

9 Claims, 6 Drawing Sheets

SOLAR-POWERED HANGING BASKET LIGHT

CROSS-REFERENCE TO RELATED APPLICATION

This application claims benefit under 35 U.S.C. §119(e) of U.S. patent application Ser. No. 13/209,044 filed Aug. 12, 2011, and entitled SOLAR LIGHT WITH CENTERING HOOK, now U.S. Pat. No. 8,454,209, which is hereby incorporated by reference herein in its entirety.

BACKGROUND OF THE INVENTION

The present invention generally relates generally to lighting systems, and more particularly, to a solar-powered hanging basket light.

Some homeowners enjoy enhancing the look of their home by using hanging baskets to hold and display items such as plants outdoors. Some items may look particularly impressive and may enhance the appearance of a home when they are highlighted during the evening hours with a spot light.

Some current systems use wall mounted lamps directed to shine on one or more baskets. While providing a flood effect around the basket, the basket itself may partially obstruct the light source causing undesirable shadowing. Other systems may use a conventional copper hardwired incandescent bulb hung chandelier style above the basket. The wiring may be snaked through hanging support cables causing the bulb to hang at uneven angles which may also promote undesirable shadowing. Hardwired systems may also increase power usage costs for the homeowner.

As can be seen, there is a need for an improved lighting system on hanging plant baskets that also promotes energy conservation.

SUMMARY OF THE INVENTION

In one aspect of the present invention, a solar-powered light is provided, comprising a body having an opening formed through the center from an upper side of the body to a bottom side of the body, at least one solar panel on the upper side of the body, and at least one light source on the bottom side of the body.

In another aspect of the present invention, a method of providing light to a hanging plant is provided, comprising passing wires and a hook of a plant hanger through an opening in a body of a solar light, the wires spreading outward to connect the hook with a pot, allowing the body of the solar light to rest on the wires below the hook, hanging the plant hanger, placing a plant in a pot of the plant hanger below the solar light, and exposing at least one solar panel, located on the top of the body, to light, whereby at least one light source, located on the bottom of the body and electrically coupled to the solar panels, is provided with current and shines light on the plant.

These and other features, aspects and advantages of the present invention will become better understood with reference to the following drawings, description and claims.

DETAILED DESCRIPTION OF THE INVENTION

Figure 1:
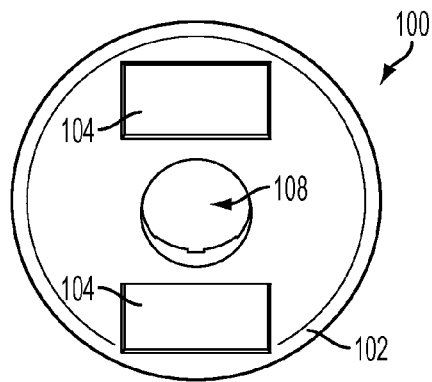
FIG. 1 illustrates a top view of an exemplary embodiment of a solar-powered hanging basket light of the present invention.
Figure 2:
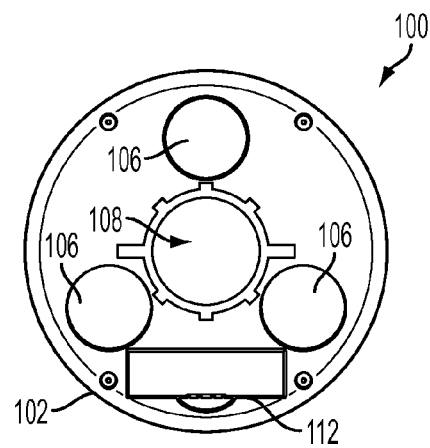
FIG. 2 illustrates a bottom view of the solar-powered light of FIG. 1.
Figure 3:
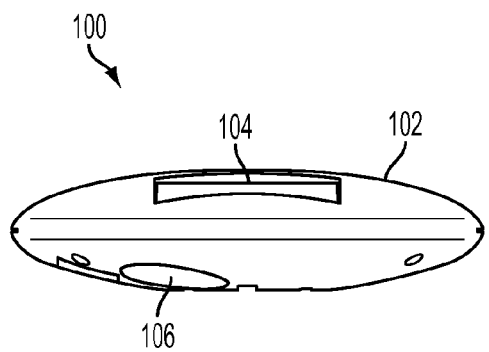
FIG. 3 illustrates a side view of the solar-powered light of FIG. 1.
Figure 4:
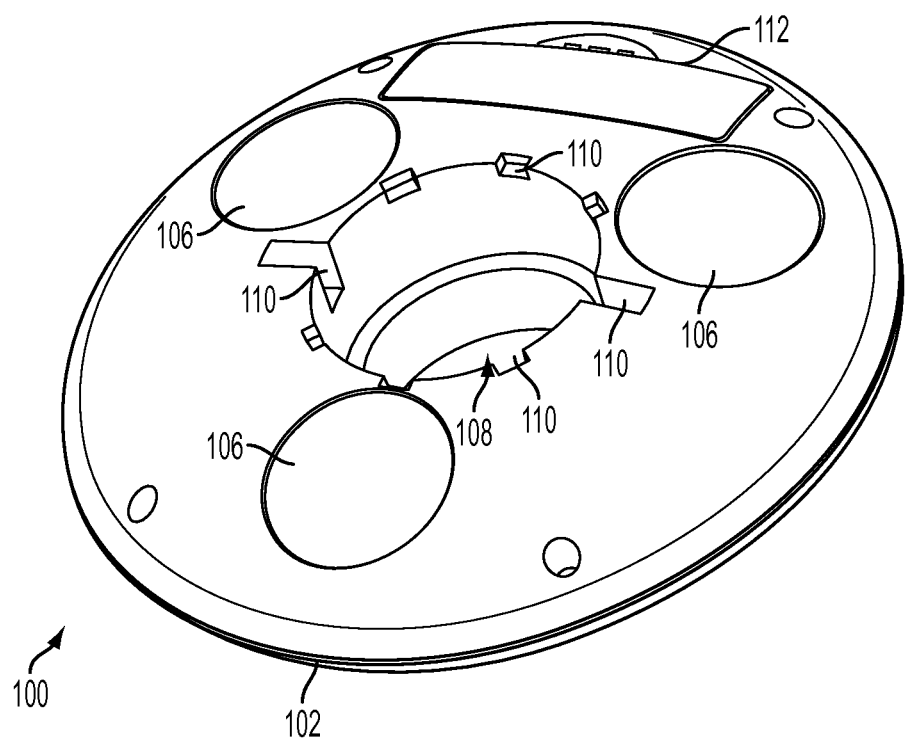
FIG. 4 illustrates a bottom perspective view of the solar-powered of FIG. 1.
Figure 5:
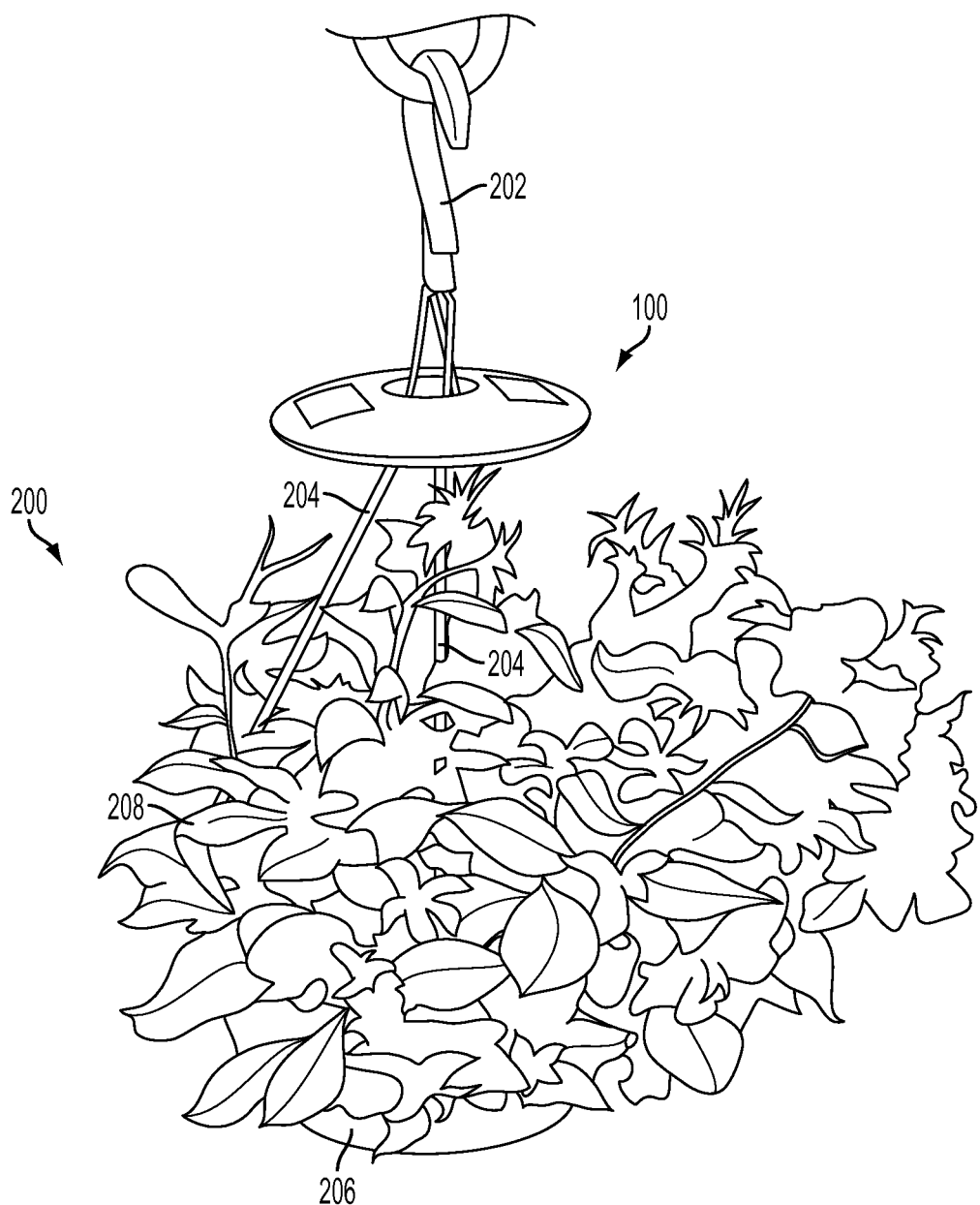
FIG. 5 illustrate a perspective view of the solar-powered light of FIG. 1 in use.
Figure 6:
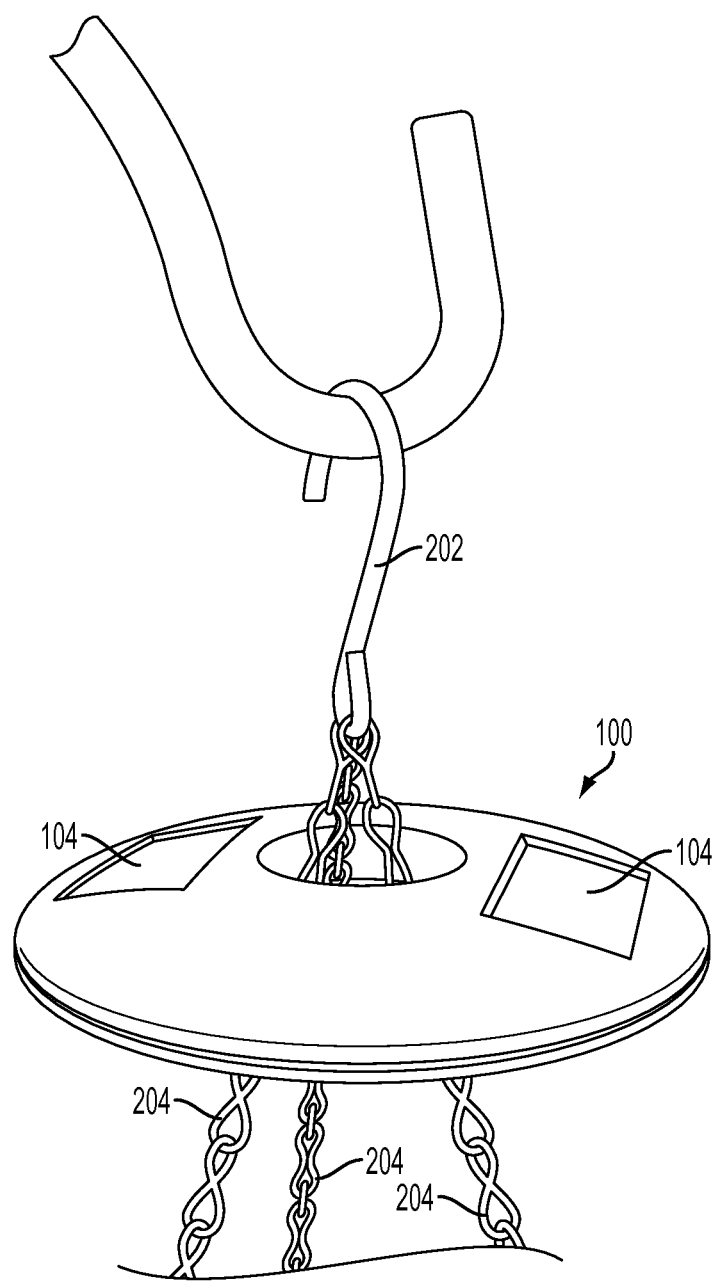
FIG. 6 illustrates a top perspective view of the solar-powered light of FIG. 1 in use.
Figure 7:
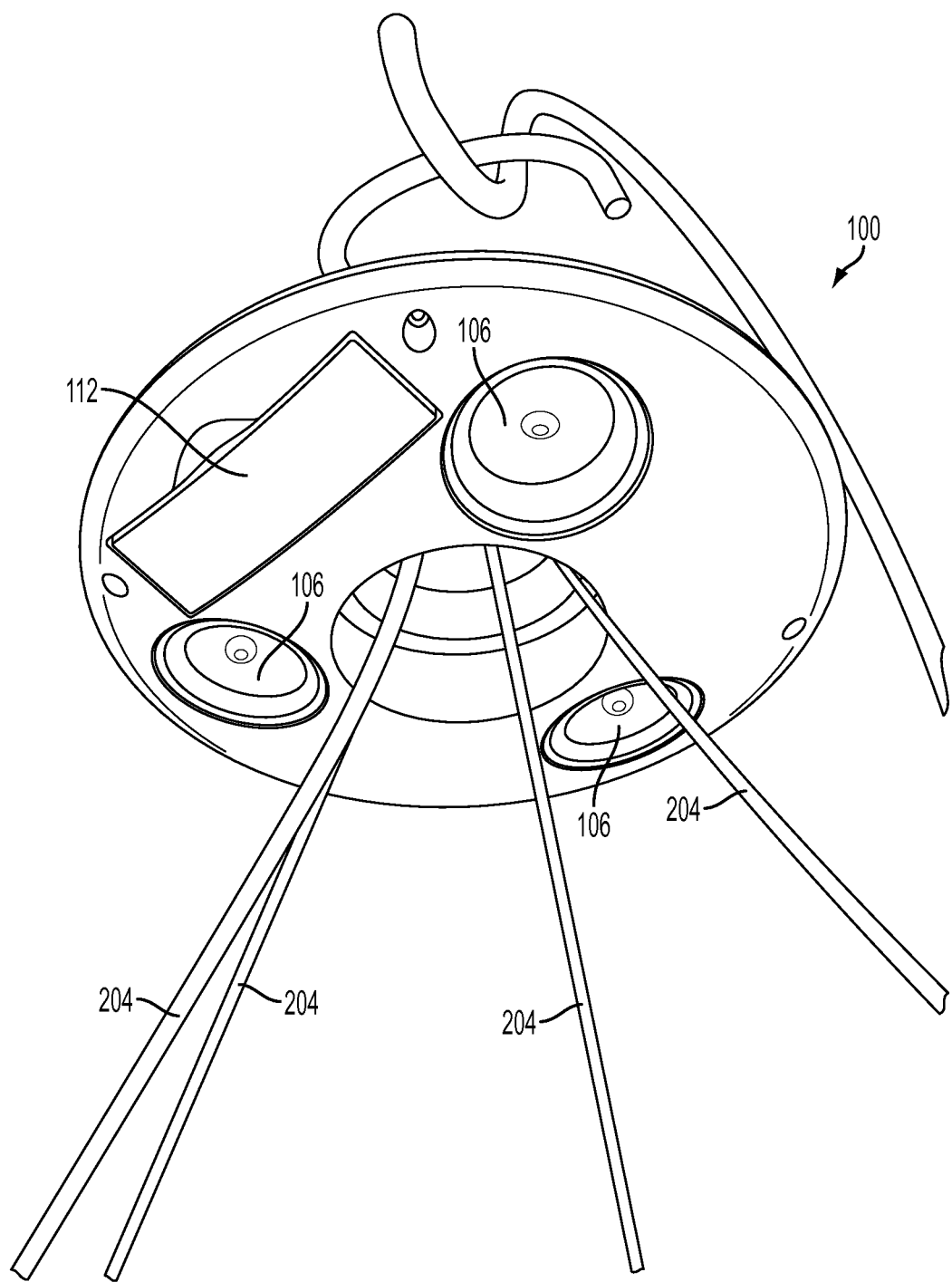
FIG. 7 illustrates a bottom perspective view of the solar-powered light of FIG. 1 in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Various inventive features are described below that can each be used independently of one another or in combination with other features.

Broadly, an embodiment of the present invention generally provides a solar-powered hanging basket light.

Referring to FIGS. 1-4, in an exemplary application, a solar-powered light 100 may include a body 102 with one or more solar panels 104 on its upper side and one or more light sources 106 on its bottom side. In one embodiment, the body 102 may be disk-shaped and have an opening 108 formed through its center. The body 102 may be circular and about 5½ inches in diameter. The body 102 may be manufactured in two or more sections out of any appropriate material, such as aluminum, plastic, etc., and may be weatherproof for outdoors use. The opening 108 may be tapered. In one embodiment, the opening 108 may be wider at the bottom than at the top, such as tapering from about 1¼ inches in diameter at the top to about 1¾ inches in diameter at the bottom. Notches 110 may be spaced around the perimeter of the bottom of the opening 108.

The solar panels 104 may be electrically coupled to provide power to charge batteries that may be retained in a battery compartment 112 accessible from the bottom of the body 102. The batteries may be electrically coupled to the light sources 106, which may be, for example, light emitting diodes, each of which may be housed within a compartment in the body 102. If desired, the compartments may be covered with clear, translucent, colored, or light-focusing lenses. The light sources 106 may be chosen for their decorative characteristics or for their growth enhancing characteristics.

Figure 8:
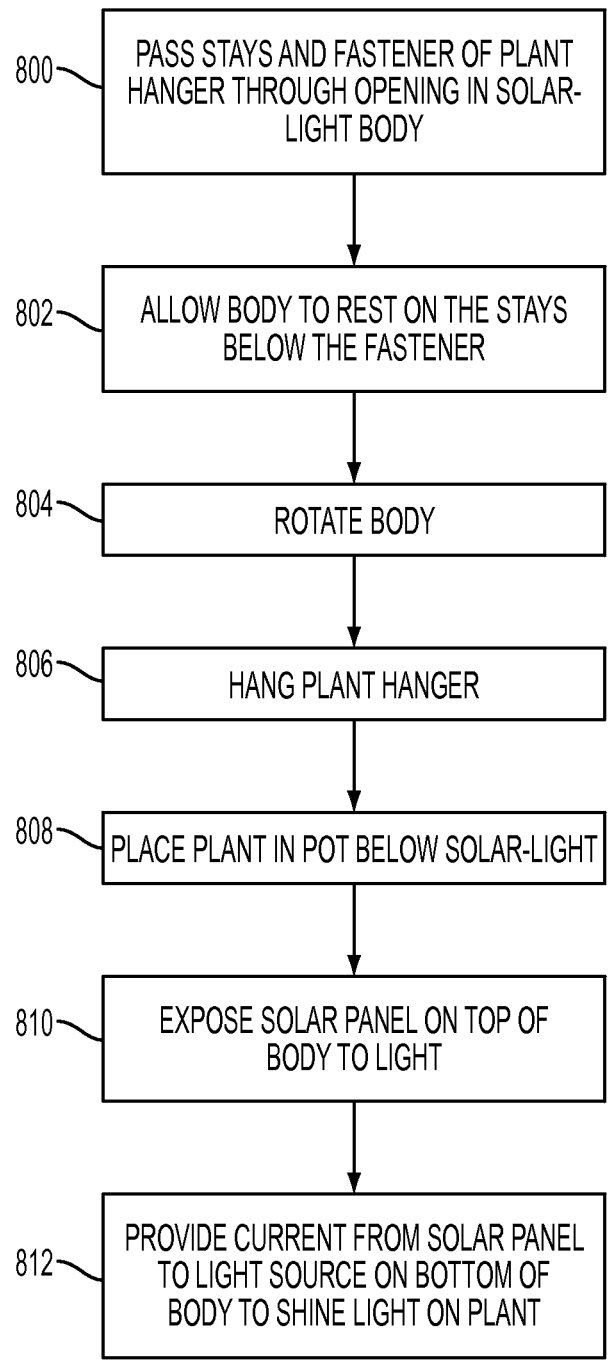
FIG. 8 is a flowchart of an exemplary embodiment of a method of providing light to a plant using the solar-powered light of FIG. 1.

Referring to FIGS. 5-8, in use, the body 102 of the solar light 100 may be placed over a plant hanger 200, with the solar panels 104 facing upward and with a fastener 202 and stays 204 passing through the opening 108 in the body 102 (FIG. 8, step 800). The fastener 202 may include a hook, eye, clamp or any other means to hang the planter 200. The stays 204 may include wires, chains, cables, or any other means to connect a pot 206 of a planter 200 with the fastener 202.) The stays 204 spread outward to connect the fastener 202 with a pot 206. The body 102 may then come to rest on the stays 204 below the fastener 202 (step 802). The body 102 may be rotated to allow the stays 204 to fit within some or all of the notches 110 around the perimeter of the bottom of the opening 108 (step 804). In this position, the solar light 100 may remain level and less susceptible to rotating or moving when the planter 200 is disturbed, such as when the wind blows. A plant 208 may be placed in a pot 206 at the bottom of the stays 204 (step 806) and the plant hanger 200 hung from any appropriate location (step 808).

When the solar panels 104 are exposed to artificial or natural light (step 810), they charge the batteries to provide electric current to the light sources 106 which, in turn, shine light onto the plant 208 (step 812).

It should be understood, of course, that the foregoing relates to exemplary embodiments of the invention and that modifications may be made without departing from the spirit and scope of the invention as set forth in the following claims.

What is claimed is:

1. A solar-powered light, comprising:
    a body having an opening formed therethrough from an upper side of the body to a bottom side of the body;
    at least one solar panel on the upper side of the body; and
    at least one light source on the bottom side of the body;
    wherein the body further comprises a plurality of notches spaced around the perimeter of the opening on the bottom side, the notches configured to retain stays connecting a plant pot with a fastener are passed through the opening.

2. The solar-powered light of claim 1, wherein the body further comprises a compartment configured to hold a battery electrically connected with the solar panels and the light sources.

3. The solar-powered light of claim 1, wherein:
    the body is approximately 5½ inches in diameter; and
    the opening is approximately 1¼ inches in diameter at the upper side and approximately 1¾ inches in diameter at the bottom side.

4. The solar-powered light of claim 1, wherein the opening is formed through the center of the body.

5. A method of providing light to a hanging plant, comprising:
    passing stays and a fastener of a plant hanger through an opening in a body of a solar light, the stays spreading outward to connect the fastener with a pot;
    allowing the body of the solar light to rest on the stays below the fastener;
    hanging the plant hanger;
    placing a plant in a pot of the plant hanger below the solar light; and
    exposing at least one solar panel, located on the top of the body, to light, whereby at least one light source, located on the bottom of the body and electrically coupled to the solar panels, is provided with current and shines light on the plant.

6. The method of claim 5, further comprising rotating the body of the solar light until the stays fit within at least some of a plurality of notches formed around a perimeter of the opening, whereby the body is substantially level and restrained from further rotation.

7. The method of claim 5, wherein the opening in the body is wider at the bottom than at the top.

8. A solar-powered light, comprising:
    a disk-shaped body having an opening formed through the center from an upper side of the body to a bottom side of the body, the opening being wider at the bottom side than at the upper side, the body further having a plurality of notches spaced around the perimeter of the opening on the bottom side, the notches configured to retain stays connecting a plant pot with a fastener when the stays and fastener are passed through the opening;
    at least one solar panel on the upper side of the body;
    at least one light source on the bottom side of the body; and
    a compartment configured to hold a battery electrically connected with the solar panels and the light sources.

9. The solar-powered light of claim 8, wherein:
    the body is approximately 5½ inches in diameter; and
    the opening is approximately 1¼ inches in diameter at the upper side and approximately 1¾ inches in diameter at the bottom side.

* * * * *